(12) United States Patent
Zimmermann (10) Patent No.: US 12,047,032 B2
(45) Date of Patent: Jul. 23, 2024

(54) SOLAR MODULE HOLDING DEVICE, AND METHOD FOR PRODUCING A SOLAR MODULE HOLDING DEVICE

(71) Applicant: Robert Zimmermann, Eberhardzell (DE)

(72) Inventor: Robert Zimmermann, Eberhardzell (DE)

(73) Assignee: Robert Zimmermann, Eberhardzell (DE)

( * ) Notice: Subject to any disclaimer, the term of this patent is extended or adjusted under 35 U.S.C. 154(b) by 0 days.

(21) Appl. No.: 17/609,744

(22) PCT Filed: May 5, 2020

(86) PCT No.: PCT/EP2020/062427
§ 371 (c)(1),
(2) Date: Nov. 8, 2021

(87) PCT Pub. No.: WO2020/225251
PCT Pub. Date: Nov. 12, 2020

(65) Prior Publication Data
US 2022/0224284 A1  Jul. 14, 2022

(51) Int. Cl.
*H02S 20/30* (2014.01)
*H02S 20/32* (2014.01)
*H02S 30/10* (2014.01)

(52) U.S. Cl.
CPC .............. *H02S 20/32* (2014.12); *H02S 30/10* (2014.12)

(58) Field of Classification Search
CPC .................................. H02S 20/32; H02S 30/10
See application file for complete search history.

(56) References Cited

U.S. PATENT DOCUMENTS

| 9,766,319 | B2 | 9/2017 | Au |
| D804,407 | S | 12/2017 | Au |
| 2015/0001356 | A1 | 1/2015 | Au |
| 2015/0200621 | A1* | 7/2015 | Reed ..................... F24S 25/636 29/525.01 |
| 2016/0365827 | A1 | 12/2016 | Au |

(Continued)

FOREIGN PATENT DOCUMENTS

| CN | 205453610 U | 8/2016 |
| DE | 20319065 U1 | 4/2004 |

(Continued)

OTHER PUBLICATIONS

German Office Action and Search Report on the Patentability of Application No. DE 10 2019 112 201.5, Mailed Mar. 18, 2020, 7 pages.

(Continued)

*Primary Examiner* — Jayne L Mershon
(74) *Attorney, Agent, or Firm* — Womble Bond Dickinson (US) LLP (57) ABSTRACT

A solar module holding device (10) is proposed, which is configured to enable an assembly of at least one, in particular solar-position-tracking, solar module (12), with a shaft (14), in particular a rotatable shaft (14), with a base body (16) that forms at least one support surface (18) configured for a support at least of a portion of the solar module (12), the base body (16) being embodied as a sheet part, which is preferably implemented as one piece.

25 Claims, 4 Drawing Sheets

(56) References Cited

U.S. PATENT DOCUMENTS

2017/0359017 A1* 12/2017 Corio .................. F16M 11/18
2018/0224161 A1    8/2018 Au
2020/0153382 A1*  5/2020 Ballentine ............ F24S 25/636

FOREIGN PATENT DOCUMENTS

ES          2351811 A1    2/2011
KR    1020090119281 A    11/2009

OTHER PUBLICATIONS

International Preliminary Report on the Patentability of Application No. PCT/EP2020/062427, Mailed Aug. 18, 2021, 3 pages.

* cited by examiner

SOLAR MODULE HOLDING DEVICE, AND METHOD FOR PRODUCING A SOLAR MODULE HOLDING DEVICE

STATE OF THE ART

The invention concerns a solar module holding device, a solar park and a method for producing a solar module holding device.

In US 2017/0359017 A1 a solar module holding device, which is configured to enable an assembly of at least one solar module, with a shaft, with a base body that forms at least one support surface configured for a support at least of a portion of the solar module, the base body being embodied as a sheet part, and with solar module holding elements which are molded on the base body integrally, has already been proposed.

The objective of the invention is in particular to provide a generic device with advantageous characteristics in regard to efficiency, in particular in regard to secure holding in combination with reduced material requirements. The objective is achieved according to the invention while advantageous implementations and further developments of the invention may be gathered from the subclaims.

Advantages of the Invention

The invention is based on a solar module holding device, which is configured to enable an assembly of at least one, in particular solar-position-tracking, solar module, with a shaft, in particular a rotatable shaft, with a base body that forms at least one support surface configured for a support at least of a portion of the solar module, the base body being embodied as a sheet part, which is preferably implemented as one piece, with at least one solar module holding element, which is molded on the base body integrally and is configured for a fixation of a solar module, and with at least one further solar module holding element, which is molded on the base body integrally and is configured for a fixation of a further solar module that is different from the solar module, the solar module holding elements being implemented in a hook shape and protruding from the support surface of the base body, wherein the solar module holding elements are in each case configured to establish a form-fit connection with respectively one solar module, wherein the base body comprises a side wall and a further side wall.

It is proposed that the solar module holding element and the further solar module holding element are in each case arranged offset from a central line of the support surface outward, toward the respective side walls. Advantageously an especially simple and/or especially efficient production of the solar module holding device, for example in a simple punch-bending procedure, is enabled. Advantageously, particularly short production times are thus achievable, as a result of which in particular costs per piece are reduced. It is moreover advantageously possible, in particular by a manufacturing from a single rectangular metal sheet, to keep a material offcut at a particularly low level. The solar module holding device is in particular embodied as an in-between piece between the shaft generating a rotation and the solar modules allocated to the shaft, said in-between piece being preferably intended, on the one hand, to transfer a movement of the shaft to the solar module and, on the other hand, to ensure a fixation of the solar module to the shaft. Preferably, within a solar park, a plurality of solar modules are allocated to one shaft, each solar module being connected to at least one, preferably to at least two, solar module holding device (s). By a "solar module" is in particular a module to be understood which is configured to generate electric power from solar light. Preferably the solar module is embodied as a photovoltaic module. In particular, the shaft is embodied as a rod, as a stick, as a bar, or the like. In particular, the shaft is connected to a motor which generates a rotation and which is preferably configured to adjust a rotation position of the shaft depending on a position of the sun. In particular, the solar modules lie, in each case in a peripheral region of the solar modules, in particular with a frame portion of the solar modules, upon the support surface of the solar module holding device. The sheet part is in particular embodied as a metal sheet part, for example as an aluminum sheet part or as a steel sheet part. "Integrally" is in particular to mean connected by substance-to-substance bond, like for example by a welding process and/or a gluing process etc., and especially advantageously molded-on, for example by a manufacturing from a cast and/or by a production via a one-component or multicomponent injection molding procedure. Advantageously, "integrally" is also to mean in one part. "In one part" is in particular to mean formed in one piece. Preferably this one piece is produced from a single blank, from one mass and/or from one cast, particularly preferentially in an injection-molding process, in particular a one-component and/or multicomponent injection-molding process. "Configured" is in particular to mean specifically programmed, designed and/or equipped. By an object being configured for a certain function is in particular to be understood that the object fulfills and/or executes said certain function in at least one application state and/or operation state.

It is furthermore proposed that a height of the base body and a width of the support surface of the base body are at least section-wise anticorrelated. In this way advantageously a high degree of efficiency is achievable, in particular as a sheet that is in a flat, unpressed state substantially rectangular can be used as a starting material, and offcut can be kept preferably small. In particular, the height of the base body is compensated by the width of the base body or vice versa. Advantageously a particularly favorable force distribution is achievable within the base body, in particular as the base body can be divided into regions which are especially suitable for receiving forces and regions which are especially suitable to form a support surface that is as large as possible. By "at least section-wise" is in particular to be understood, in this context, that there is at least one section that, viewed along a longitudinal direction of the base body, is situated between a center of the base body and an end region of the base body. In particular, the height of the base body and the width of the support surface of the base body are anticorrelated at least in a region of the base body in which the support surface of the base body tapers along the longitudinal direction. By a "longitudinal direction" of an object, in particular of the base body or the support surface, is in particular a direction to be understood which extends parallel to a main extension direction of the same object, in particular the base body of the support surface, wherein the "main extension direction" of an object is here in particular to mean a direction extending parallel to a longest edge of a smallest geometrical rectangular cuboid that just still encloses the object completely. In particular, the longitudinal direction of the base body and the longitudinal direction of the support surface are parallel to each other, preferably identical to each other. A "height" of the base body is in particular to mean an extension of the base body in a direction that is perpendicular to a support plane formed by the support surface. A "width" of the support surface is in particular to mean an extension of the support surface in a direction that is perpendicular to the longitudinal direction. By two parameters being "anticorrelated" is in particular to be understood that an increase of one of the parameters will result in a reduction of the other parameter or vice versa.

If the base body comprises at least one tapering region, within which the support surface tapers towards a center of the base body, advantageously a particularly favorable force distribution within the base body and/or a particularly favorable force-receiving capacity of the base body are/is achievable, in particular as an especially great rigidity of the base body against a load, in particular in a direction perpendicularly to the support surface, is achievable in a central region of the base body, and/or as a preferably large support surface is rendered possible in a region of the base body that is situated peripherally in a longitudinal direction of the support surface. A center of the base body is in particular to mean a center of the support surface in the longitudinal direction of the support surface. Preferably, the support surface tapers toward the center of the support surface from both end regions of the base body, which are situated peripherally in the longitudinal direction. In particular, the support surface has a maximum width in the, viewed in the longitudinal direction, end regions of the base body. In particular, the support surface has a minimum width in the, viewed in the longitudinal direction, central region of the base body. Preferably the tapering is realized continuously and/or linearly in the tapering region. Alternatively, the tapering may also have a course that differs from a linear course. In particular, within the tapering region the width of the support surface is reduced by at least 40%, preferably by at least 65%, preferentially by at least 100% and especially preferentially by at least 150%.

An especially advantageous force distribution over the base body and/or an especially advantageous force-receiving capacity of the base body is also achievable if the height of the base body increases in the tapering region toward the center of the base body, in particular toward the center of the support surface. In this way, advantageously a particularly high rigidity of the base body is achievable in a proximity of the center of the base body, respectively in a proximity of a shaft support element, which is preferably arranged centrally in the base body, and which is configured for a connection of the base body to the shaft. In particular, a ratio of a height of the base body and a width of the support surface is in one of the end regions of the base body, which are situated peripherally in the longitudinal direction, is at least 1:3, preferably at least 1:2 and preferentially no more than 1:1. In particular, a ratio of a height of the base body and a width of the support surface is in the center of the support surface maximally 2:1, preferably no more than 3:2 and preferentially no less than 1:1. In particular, the height of the base body increases within the tapering region by at least 30%, preferably by at least 50% and preferentially by at least 70% and particularly preferentially by maximally 100%.

For a further improvement of the advantageous force distribution and/or the advantageous force-receiving capacity, it is proposed that the base body comprises at least one side wall, preferably two side walls, which is/are bent off at least substantially perpendicularly to the support surface. In particular, the side wall is embodied in a one-part implementation with the sheet part. In particular, the side wall is implemented by a portion of the sheet part that is bent off in an angle of approximately 90° relative to the support surface. In particular, the base body comprises two side walls, which are arranged on opposite ends of the base body. In particular, the side walls are arranged at least on long edges of the base body. In particular, the side walls are arranged at least at those ends of the base body which delimit the base body perpendicularly to the longitudinal direction. In particular, the side walls are implemented at least substantially identically to each other. "Substantially identically" is in particular to mean identically except for manufacturing tolerances. The term "substantially perpendicularly" is here in particular intended to define an orientation of a direction relative to a reference direction, wherein the direction and the reference direction, in particular viewed in a plane, include an angle of 90° and the angle has a maximum deviation that is in particular less than 8°, advantageously less than 5° and especially advantageously less than 2°.

Moreover, for a further improvement of the advantageous force distribution and/or the advantageous force-receiving capacity, it is proposed that the side wall delimits the base body sidewise at least along a large portion of a longitudinal extension of the base body. "Sidewise delimiting" the base body is in particular to mean delimiting the base body in a direction that is perpendicular to the longitudinal direction of the base body. A "longitudinal extension" is in particular to mean a maximum extension of the base body in a direction that runs parallel to the main extension direction and/or to the longitudinal direction. A "large portion of the longitudinal extension" is to mean, in this context, in particular at least 51%, preferably at least 55% and preferentially at least 60% of a total longitudinal extension of the base body. Particularly preferentially, the side walls delimit the base body along the entire longitudinal extension of the base body, except for a region of the base body in which the base body forms shaft support elements.

It is also proposed that total lengths of developments of sections made perpendicularly to a longitudinal direction of the base body are at least substantially constant over a large portion of the base body, in particular in the tapering region. In this way a high efficiency in regard to material consumption is advantageously achievable. This in particular allows keeping offcut at an especially low level. Advantageously a development of the entire base body is at least substantially equivalent to a rectangular plate. A "large portion of the base body" is to mean, in this context, at least 51%, preferably at least 60%, preferentially at least 66% and especially preferentially at least 75% of the entire base body. In particular, at least 70%, preferably at least 80%, of all total lengths of developments of sections made perpendicularly to a main extension direction are at least substantially constant in the tapering region. A "development" is in particular to mean a sheet development and/or a plate. Preferably, the development is to mean an imaginary, in particular unbent, sheet, which is necessary for a production of the base body, for example by edge bending or by punch bending. By "substantially constant" total lengths are in particular, in this context, lengths to be understood which have a maximum difference from each other that is smaller than 5%, preferably smaller than 3% and preferentially smaller than 1%.

If at least a large portion of the base body has an at least substantially constant material thickness, in particular wall thickness, an especially high stability of the solar module holding device is advantageously achievable. Moreover, an especially high efficiency regarding material consumption is advantageously achievable, in particular as no wall thickness reductions, due to tensile stress on the original sheet, need to be calculated in when selecting a desired final wall thickness, such that in particular non-deformed portions of the base body can have an unnecessarily high material thickness. In particular, the base body is produced at least substantially without a production procedure in which a material thickness is changed, for example deep drawing. This advantageously allows keeping deviations of wall thicknesses of different solar module holding devices at a low level. A "large portion of the base body" is to mean, in this context, in particular at least 90%, preferably at least 95%, advantageously at least 97% and preferentially at least 99%. Particularly preferentially, the entire base body has a constant material thickness, in particular wall thickness, in particular with the exception of partial regions of the shaft support elements. By a "substantially constant material thickness" is in particular a material thickness to be understood which is constant within a range of manufacturing tolerances. Preferably a deviation of the material thicknesses, distributed over the base body, is less than 8%, advantageously less than 5%, preferentially less than 3% and especially preferentially less than 1%. In particular, the constant material thickness is approximately 2.5 mm.

Furthermore, it is proposed that the base body, in particular the side wall, forms at least the shaft support element, which is configured for a support of the base body on the shaft. This in particular allows achieving a stable support of the base body on the shaft. Advantageously, high stability is achievable, in particular of a mounted state, in which the base body is fixated on the shaft. The shaft support element is embodied in a one-part implementation with the base body. The shaft support element is bent off the side wall at least substantially perpendicularly to the side wall. The shaft support element is bent off the side wall in such a way that it points away from the support surface outwards. Alternatively, the shaft support element could also be implemented in such a way that it points inward toward the support surface, or as an edge of the side wall, which is in particular implemented free of a bend and is configured to lie upon the shaft directly with the edge. In particular, the shaft support element forms a shaft support surface, which in the mounted state lies upon a surface of the shaft.

It is further proposed that the shaft support element has an extension perpendicularly to a longitudinal direction of the support surface of the base body, which is equivalent at least to a three-fold, preferably a four-fold, of a material thickness of the base body. This advantageously allows achieving an especially high stability, in particular of the mounted state, in which the base body is fixated on the shaft. It is moreover advantageously possible to prevent a canting of the base body with the shaft. In particular, the extension of the shaft support element perpendicularly to the longitudinal direction of the support surface of the base body is 10 mm.

If the shaft support surface formed by the shaft support element forms an at least substantially polygonal contour, in particular an at least substantially semi-hexagonal contour, in a side view onto the base body, particularly high stability is achievable, in particular of the mounted state, in which the base body is fixated on the shaft. This moreover advantageously allows achieving a rotationally fixed holding of the base body—and thus of the solar module—on the shaft. This is advantageously achievable by the base body following a rotation of the shaft around a rotation axis of the shaft that runs parallel to a longitudinal direction of the shaft. In particular, the contour is polygonal, preferably semi-hexagonal, with the exception of a single side of the polygon, preferably the semi-hexagon, that has an additional, in particular circular-arc-shaped, recess and/or bulge.

In addition, it is proposed that the shaft support element comprises at least one partial region which is configured, when the base body lies upon the shaft, to remain free of a contact with the shaft, thus providing an, in particular enlarged, interspace between the shaft and the base body in a longitudinal direction of the shaft. In this way, in the mounted state, in which the base body is fixated on the shaft, an, in particular enlarged, space is obtainable for guiding cables or something like that along the shaft. In particular, this advantageously permits guiding a plug, in particular a standardized solar module plug, through the interspace between the shaft and the base body. Advantageously, this allows achieving a high degree of mounting efficiency and/or maintenance efficiency.

Beyond this it is proposed that, in particular in order to enable an advantageous fixation of the base body on the shaft, the side wall has at least one recess that is configured for a fixation of a shaft mounting clamp. In particular, the recess is implemented as a rectangular long hole, which in particular extends along the side wall in a direction running parallel to the support surface of the base body. Preferably each side wall has at least two recesses, which are configured for a fixation of respectively one shaft mounting clamp. In particular, the recesses of different side walls are arranged opposite each other in a direction that is perpendicular to the longitudinal direction of the base body. In particular, the two recesses of a side wall are arranged on opposite sides relative to the shaft support element of the side wall. In particular, the recesses of a side wall are arranged mirror-symmetrically to each other. In particular, an extension of each recess in a direction that is perpendicular to the support surface of the base body is enlarged on a side of the recess that faces toward the shaft support element. In this way it is advantageously possible to prevent a slipping of the shaft mounting clamp in the mounted state. The shaft mounting clamp is in particular configured, in the mounted state, to partly engage into at least two recesses which are arranged on opposite-situated side walls, and thereby to be hooked into the recess.

If the recess for receiving the shaft mounting clamp is arranged at least partly, preferably at least to a large portion, in a tapering region of the base body, a high degree of mounting efficiency is advantageously achievable. In particular, particularly simple mounting of the shaft mounting clamp on the base body is advantageously enabled. This in particular allows a portion of the shaft mounting clamp, which is configured for an engagement in the recess of the side wall, being slid between opposite-situated side walls first in a region of the base body in which the side walls have a greater distance from each other because of the tapering of the support surface, as a result of which said portion of the shaft mounting clamp in the recesses can be positioned in a simple manner. Advantageously, the portion of the shaft mounting clamp configured for an engagement in the recess of the side wall can then be moved further toward the center of the base body until it preferably projects from the recesses sidewise and protrudes beyond the side walls, and is thus fixated relative to the base body at least in a direction that is perpendicular to the support surface. "A large portion" is to mean, in this context, in particular by 80%, preferably by 90% and preferentially by 95%.

The solar module holding device comprises at least one solar module holding element, which is molded on the base body integrally, preferably in a one-part implementation, and is configured for a fixation and/or positioning of a solar module. This advantageously allows achieving a high mounting efficiency. In particular, easy mounting of the solar module to the base body is advantageously enabled.

The solar module holding device comprises at least one further solar module holding element, which is molded on the base body integrally, preferably in a one-part implementation, and is configured for a fixation and/or positioning of a further solar module that differs from the solar module. In this way a high mounting efficiency is advantageously achievable. In particular, advantageously easy mounting of the further solar module to the base body is enabled. Advantageously, at least two solar modules can be mounted on the solar module holding device. In particular, viewed in the longitudinal direction of the base body, the solar module holding element and/or the further solar module holding element are/is arranged in an end region of the base body. By an "end region" is in particular a region of the base body to be understood which is formed of points whose distance from an end of the base body in the longitudinal direction is maximally 30 mm, preferably no more than 40 mm and preferentially no more than 50 mm. Especially preferentially, the end region is implemented as at least one region of the base body that is formed of points whose distance from an end of the base body situated in the longitudinal direction corresponds to maximally 10% of a maximum longitudinal extension of the base body. In particular, the solar module holding element and/or the further solar module holding element are/is arranged on the support surface of the base body. The solar module holding element and the further solar module holding element protrude from the support surface of the base body. The solar module holding element and the further solar module holding element are respectively arranged offset from a central line of the support surface outward, toward the respective side walls, wherein in particular one of the solar module holding elements is arranged nearer to one side wall and the other one of the solar module holding elements is arranged nearer to the opposite side wall. In particular, the solar module holding element and/or the further solar module holding element are/is arranged in a region of the support surface in which the support surface has a maximum width. In particular, the solar module holding element and/or the further solar module holding element are/is arranged outside the tapering region. The solar module holding elements are in each case configured to establish a form-fit connection with respectively one solar module. In particular, the solar module holding elements are configured to engage in a form-fit manner into a recess of the solar modules that corresponds to the solar module holding elements. In particular, the solar module holding elements are spaced apart from each other, in a plane of the support surface, in a direction perpendicularly to the longitudinal direction of the support surface, by at least 40 mm, preferably by at least 49 mm, advantageously by at least 55 mm, preferentially by at least 61 mm and especially preferably by no more than 70 mm. A "fixation" is in particular to mean a hooking-in and/or a pre-mounting, in particular for a pre-positioning for a final mounting. A "positioning" is in particular to mean an orientation and/or the pre-positioning.

The solar module holding elements are implemented in a hook shape. In this way high mounting efficiency is advantageously achievable, in particular as a simple, preferably toolless, mounting, in particular pre-mounting, and/or positioning of the solar modules on the base body is enabled. Advantageously, this allows establishing a form-fit connection between the base body and the solar module. In particular, the hook-shaped solar module holding element protrudes at least substantially perpendicularly from the support surface of the base body. Preferably, the hook-shaped solar module holding element forms an abutment surface for a solar module, which is arranged at least substantially perpendicularly to the support surface. In particular, the solar module holding element protrudes beyond the support surface at least by 4 mm, preferably at least by 6 mm and preferentially at least by 8 mm. By a "hook-shaped" solar module holding element is in particular a solar module holding element to be understood which is curved or angularly bent in such a way that a load can be hooked into the solar module holding element in at least one orientation of the solar module holding element. In particular, the ends of the hook-shaped solar module holding elements point in the longitudinal direction of the support surface. In particular, the ends of the hook-shaped solar module holding elements point in a direction that points away from the center of the support surface.

In addition, it is proposed that the solar module holding device comprises at least one potential compensation element, in particular grounding element, which is molded on the base body integrally, preferably in a one-part implementation, and which is configured for an electrical contacting, in particular electrical grounding, of a solar module. This advantageously allows achieving a high efficiency, in particular in regard to mounting and/or to material consumption. On the one hand, a necessary electrical grounding of a mounted solar module is advantageously achievable in an especially simple fashion. This advantageously allows a reduction of costs. On the other hand, advantageously a necessary electrical grounding of the mounted solar module can be brought about without requiring additional components. Advantageously, high operational safety can be ensured. By a "potential compensation element" is in particular an element to be understood which is configured to establish a potential compensation between the solar module, in particular a frame of the solar module, and the base body, in particular the earth. In particular, the base body is earthed, at least in its mounted state. In particular, the base body is in its mounted state on an earth potential.

It is further proposed that the solar module holding device comprises at least one further potential compensation element, in particular a further grounding element, which is molded on the base body integrally, in particular in a one-part implementation, and which is configured for electrically contacting, in particular electrically grounding, a further solar module which is different from the solar module. In this way advantageously simple and material-saving electrical grounding of a further solar module by the solar module holding device is enabled. In particular, viewed in the longitudinal direction of the base body, the potential compensation element and/or the further potential compensation element are/is arranged in the end region of the base body. Especially preferentially the potential compensation elements are arranged on an edge of the base body that is situated peripherally in the longitudinal direction. In particular, the potential compensation element and/or the further potential compensation element are/is arranged on the support surface of the base body. In particular, the potential compensation element and/or the further potential compensation element protrude/s from the support surface of the base body. In particular, the potential compensation element and/or the further potential compensation element are/is arranged respectively offset from a central line of the support surface outward, toward the respective side walls, wherein in particular one of the potential compensation elements is arranged nearer to one side wall and the other one of the potential compensation elements is arranged nearer to the opposite side wall. In particular, the potential compensation element and/or the further potential compensation element are/is arranged in a region of the support surface in which the support surface has a maximum width. In particular, the potential compensation element and/or the further potential compensation element are/is arranged outside the tapering region. In particular, the potential compensation elements are arranged in a plane of the support surface spaced apart from each other by at least 40 mm, preferably by at least 49 mm, advantageously by at least 55 mm, preferentially by at least 61 mm and especially preferentially by no more than 70 mm in a direction that is perpendicular to the longitudinal direction of the support surface. In particular, the potential compensation elements and the solar module holding elements are arranged at ends of the base body which are situated opposite each other in the longitudinal direction. It is in particular conceivable that the base body comprises more than two solar module holding elements and/or potential compensation elements, which are in particular embodied in a one-part implementation with the base body.

If the potential compensation element/s, preferably the grounding element/s, forms/form at least one tip which protrudes, in particular at least substantially perpendicularly, from the support surface and which is in particular configured to penetrate a surface layer of the solar module lying upon the support surface, for example an anodized layer of the solar module, advantageously a potential compensation that is particularly simply mountable and/or particularly material saving is achievable in the mounted state. In particular, the tip protrudes from the support surface upwards by at least 1 mm.

If the base body comprises, in particular on the support surface, at least one threaded hole, a high level of mounting efficiency is advantageously achievable. In particular, simple final mounting of solar modules, which were in particular hooked into the solar module holding elements in a pre-mounting step, on the base body is advantageously achievable. Advantageously, as a result no counterpieces, like for example nuts, are necessary for mounting, such that a mounting, in particular final mounting, of the solar modules to the solar module holding devices can be carried out from only one side of the solar modules, in particular from an upper side of the solar modules. In particular, viewed in the longitudinal direction of the base body, the threaded hole is arranged in the end region of the base body. In particular, the threaded hole is arranged on a central line of the support surface, which preferably divides the support surface in two. In particular, the threaded hole is arranged in a region of the support surface in which the support surface has a maximum width. In particular, the threaded hole is arranged outside the tapering region. In particular, the threaded hole has an inner thread. In particular, the threaded hole forms an M6 thread, an M7 thread, an M8 thread, an M9 thread or an M10 thread. In particular, the base body has a further threaded hole. In particular, viewed along the longitudinal direction, the threaded holes are arranged on opposite-situated ends of the base body. In particular, the threaded holes are implemented at least substantially identically to each other. It is in particular conceivable that the base body has more than two threaded holes.

Furthermore, it is proposed that the base body comprises a stiffening element, which is realized in particular as one piece, preferably in a one-part implementation with the base body, which is arranged in a proximity of the threaded hole and which is configured for stiffening the base body at least in the proximity of the threaded hole. In this way particularly high stability is advantageously achievable. In particular, the stiffening element is embodied as at least one crimp, preferably as at least two crimps, which in particular at least partly engages/engage around the threaded hole in the plane of the support surface. In particular, the stiffening element has a depth of at least 2 mm. In particular, each threaded hole has a separate stiffening element. By a "proximity" is in particular a region to be understood which is formed of points having a distance from the threaded hole that is smaller than a four-fold, preferably smaller than a three-fold, opening diameter of the threaded hole.

If the support surface further comprises at least one crimp for a stiffening of the base body, which is arranged centrally in the base body, a particularly high degree of stability is achievable with at the same time minimized material consumption. In particular, the crimp has a depth of at least 2.5 mm. In particular, the crimp has a length of at least 200 mm. In particular, the crimp is implemented so as to peter out flatly in the end regions of the crimp. In particular, in the flatly out-petering end regions a gradient of the crimp is smaller than 45°, preferably smaller than 35°. This advantageously allows achieving that, with a 45°-inclination of the base body relative to a planar ground surface, rain water accumulated in the crimp will drain off completely. It is in particular conceivable that the base body comprises more than one crimp for a stiffening of the base body.

It is also proposed that the base body comprises at least one recess for receiving a blind rivet, which is arranged offset sidewise relative to a central axis of the base body that runs parallel to a longitudinal direction of the base body. In this way, advantageously a particularly simple and stable mounting of the solar modules to the base body is enabled. In particular, the mounting via the blind rivet may be effected alternatively or additionally to the mounting via the threaded hole. The recess for receiving the blind rivet is in particular realized as a hole in the support surface. In particular, the base body comprises a further recess for receiving a further blind rivet, which is arranged offset sidewise relative to a central axis of the sheet part that runs parallel to a main extension direction of the base body in the opposite sense to the, in particular above-described, recess for receiving the blind rivet. In particular, recesses for receiving the blind rivets are arranged in the tapering region of the base body. In particular, the recesses for receiving the blind rivets are arranged, in the longitudinal direction, on opposite sides of the center of the base body. In particular, for a mounting of a blind rivet access is necessary advantageously only from one side, such that advantageously mounting of the solar modules on the base body is still possible exclusively from an upper side of the solar modules.

In addition, it is proposed that the base body is implemented at least substantially in a mirror-symmetrical manner, in particular except for recesses for receiving blind rivets. This advantageously allows achieving high mounting efficiency, in particular as during mounting the solar module holding device can be rotated by 180° according to requirements. As a result, it is advantageously possible to avoid mounting faults and to accelerate a mounting in overall fashion. In particular, the base body is implemented mirror-symmetrically with respect to at least two mirror planes. In particular, a first mirror plane is spanned by a central line dividing the support surface in two in the longitudinal direction and by a perpendicular line on the support surface. In particular, a second mirror plane is spanned by a further central line dividing the support surface in two perpendicularly to the longitudinal direction and by the perpendicular line on the support surface.

If the base body moreover comprises an anticorrosion protection coating, a long lifespan is advantageously achievable. In particular, the base body has a hot galvanization and/or a Zn—Al—Mg coating, for example a Magnelis® coating.

Beyond this it is proposed that the solar module holding device comprises the shaft mounting clamp, which is configured for a rotationally fixed mounting of the base body to the shaft. This advantageously enables efficient and simple mounting of the solar module holding device on the shaft. It is furthermore advantageously possible to ensure that the solar modules mounted via the solar module holding device are capable of following a rotation movement of the shaft. The shaft mounting clamp comprises at least two clamping elements, which are configured to be joined in mounting, such as to engage around the shaft at least on half a circumference of the shaft.

Furthermore, a solar park with a plurality of solar module holding devices, with at least one shaft and with a plurality of solar modules, as well as a method for producing the base body of the solar module holding device are proposed, wherein at least one solar module holding element and at least one further solar module holding element are molded on the base body integrally, in each case offset from a central line of the support surface of the base body outward, toward side walls of the base body.

As in a production of the base body a sheet offcut of less than 15%, preferably less than 10%, preferentially less than 7% and particularly preferentially less than 5% of an, in particular flat and recess-free, original sheet is produced, high efficiency in regard to material consumption and/or in regard to energy consumption is advantageously achievable. As a result, costs per piece can be kept advantageously low. In particular, sheet offcut is limited to the threaded holes, to the recesses for receiving a blind rivet, to maximally two ejection holes for an ejection of the base body from a bending device and/or to the region of the shaft support elements.

It is further proposed that the base body is produced via a pressing method, wherein maximally 10%, preferably maximally 5% and preferentially no more than 3% of a total area of a metal sheet which the base body is produced from are exposed to a substantial tensile stress during a pressing process of the pressing method, and/or wherein in the pressing process of the pressing method a material thickness of the metal sheet which the base body is produced from is substantially changed on maximally 10%, preferably no more than 5% and preferentially no more than 3% of a total area of the metal sheet. In this way especially high stability of the solar module holding device is advantageously achievable. Moreover, an especially high degree of efficiency regarding material consumption is advantageously achievable, in particular as no wall thickness reductions due to tensile stress of an original sheet need to be calculated in when selecting a desired final wall thickness. Advantageously, this allows keeping deviations of wall thicknesses of different solar module holding devices at a low level. By a "substantial tensile stress" is in particular a tensile stress to be understood which induces a substantial change of a material thickness of a processed metal sheet. A "substantial change" of a material thickness of the metal sheet is in particular to mean a change, in particular a reduction, of the material thickness of the metal sheet by more than 10%, preferably by more than 7%, preferentially by more than 5% and particularly preferentially by more than 3%.

Herein the solar module holding device according to the invention, the solar park according to the invention and the method according to the invention shall not be limited to the application and implementation described above. In particular, in order to fulfill a functionality that is described here, the solar module holding device according to the invention, the solar park according to the invention and the method according to the invention may have a number of individual elements, components and units that differs from a number given here.

DRAWINGS

Further advantages will become apparent from the drawings. In the drawings an exemplary embodiment of the invention is illustrated. The drawings, the description and the claims contain a plurality of features in combination. Someone skilled in the art will purposefully also consider the features separately and will find further expedient implementations.

It is shown in.

DESCRIPTION OF THE EXEMPLARY EMBODIMENT

Figure 1:
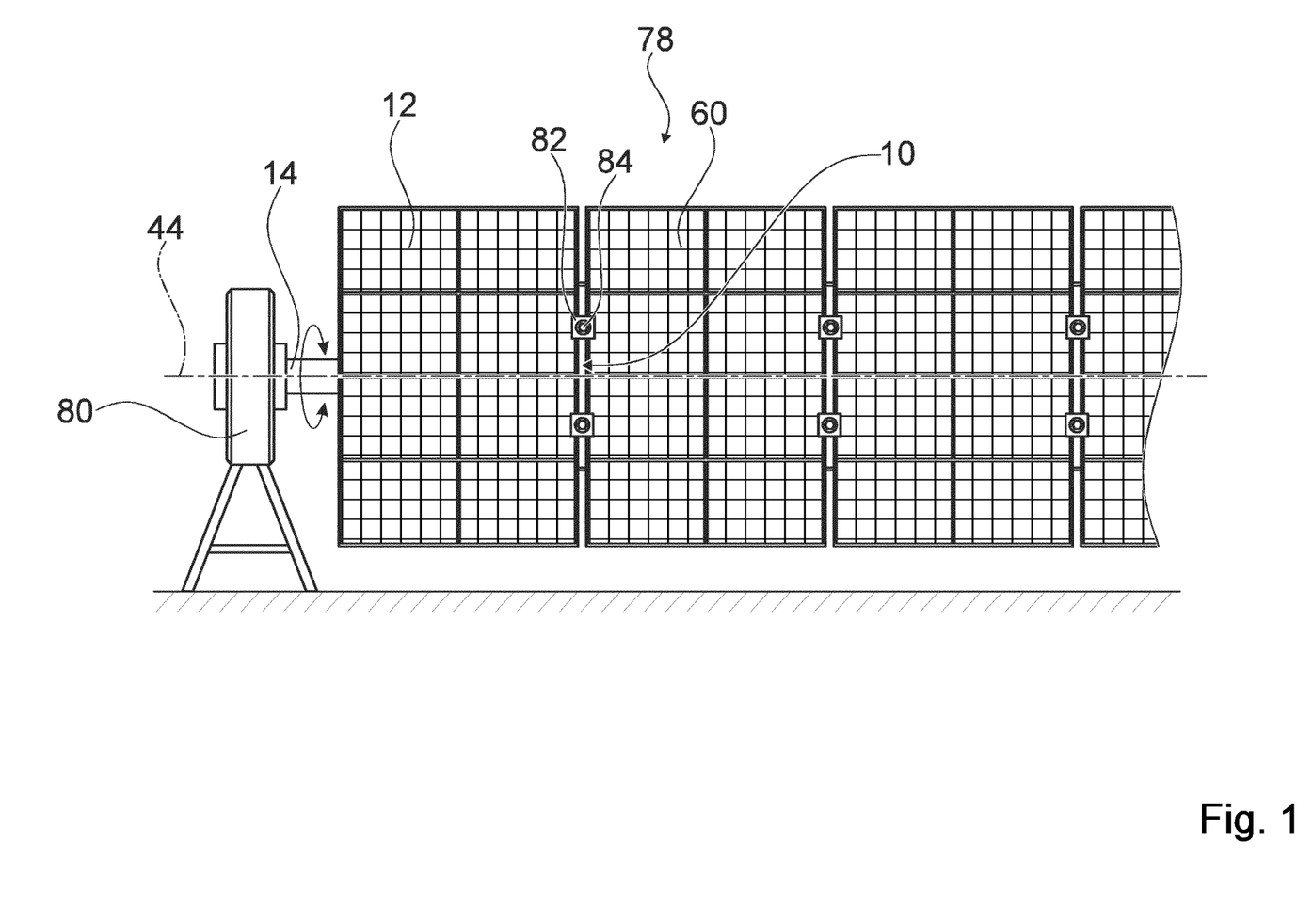
FIG. 1 a section of a schematic representation of a solar park with a plurality of solar modules and with a plurality of solar module holding devices, FIG. 2 a schematic perspective view of the solar module holding device connected to a solar module and to a shaft, FIG. 3 a schematic side view of a base body of the solar module holding device, which is mounted to the shaft by means of a shaft mounting clamp, FIG. 4*a* a schematic top view of the base body, FIG. 4*b* a schematic front view of the base body, and FIG. 5 a flow chart of a method for a production of the base body.

FIG. 1 shows part of a solar park 78 with a plurality of solar modules 12, 60. The solar modules 12, 60 are movable in such a way that they are capable of at least substantially following a position of the sun. The solar modules 12, 60 are implemented to be solar-position-tracking. The solar park 78 comprises at least one shaft 14. The solar modules 12, 60 are coupled with a shaft 14. The solar park 78 comprises a drive unit 80. The shaft 14 is rotatable rotarily in two rotation directions around a longitudinal axis of the shaft 14 that is parallel to a longitudinal direction 44 of the shaft 14. The shaft 14 is configured to transfer a rotation of the drive unit 80 to the solar modules 12, 60.

The solar park 78 comprises a plurality of solar module holding devices 10. The solar modules 12, 60 are fastened to the solar module holding devices 10 by means of a plurality of fixation platelets 82 and fixation screws 84. The solar module holding devices 10 are configured to enable a mounting of the solar-position-tracking solar modules 12, 60 with the rotatable shaft 14. The shaft 14 is implemented as a bar having a substantially hexagonal cross section. In this way it is advantageously possible to simplify a transfer of a rotation movement via the shaft 14. The shaft 14 is hollow in its interior.

Figure 2:
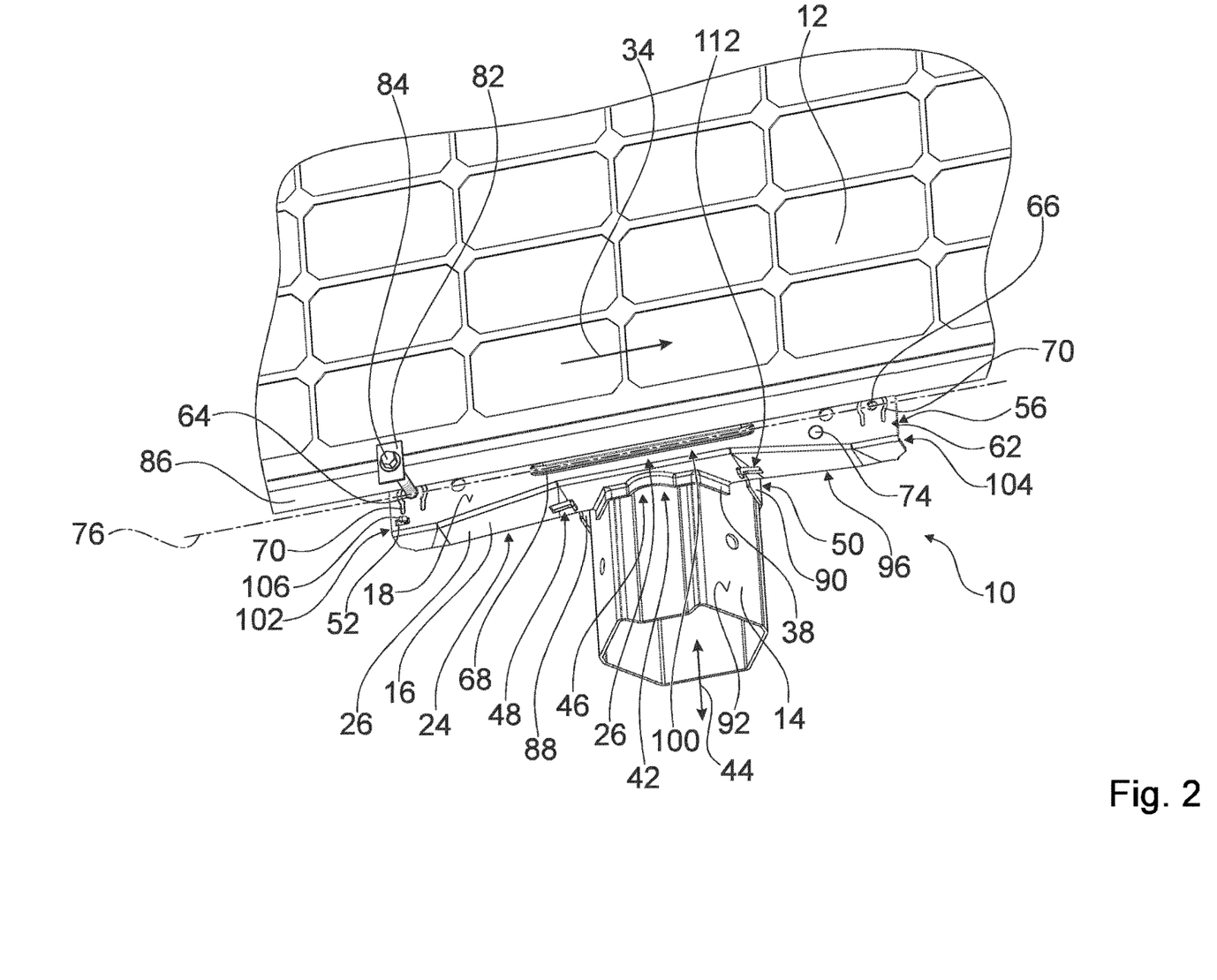

FIG. 2 shows a perspective view of the solar module holding device 10 coupled with a solar module 12 and with the shaft 14. The solar module holding device 10 comprises a base body 16. The base body 16 forms a support surface 18. The support surface 18 is configured for a support at least of a portion of the solar module 12 on the base body 16. The base body 16 is embodied as a sheet part. The base body 16 is embodied as a sheet part in a one-part implementation. The base body 16 comprises an anti-corrosion protection coating. In a mounted state, the solar module 12 lies upon the support surface 18 in such a way that an edge 86 of the solar module 12 runs parallel to a central axis 76 of the support surface 18 that runs parallel to a longitudinal direction 34 of the support surface 18. In the drawing of FIG. 2, the solar module 12 covers about half of the support surface 18. On the lefthand side of FIG. 2 it is shown, by way of example, how the solar module 12 is fixedly clamped to the base body 16 by means of the fixation platelet 82 and the fixation screw 84. The fixation platelet 82 is moreover configured to clamp at the same time a further, neighboring solar module 60 (not shown in FIG. 2), which lies upon the other half of the support surface 18.

The base body 16 comprises a threaded hole 64. The base body 16 comprises a further threaded hole 66. The threaded holes 64, 66 are arranged on the support surface 18. The threaded holes 64, 66 each have an inner thread. The inner thread that is shown in the figures by way of example is configured to receive an M8 screw. The threaded holes 64, 66 are configured to receive respectively one fixation screw 84. The threaded holes 64, 66 are arranged centrally in end regions 102, 104 of the base body 16 in the support surface 18. The threaded holes 64, 66 are spaced apart from each other by 400 mm along the longitudinal direction 34. By screwing the fixation screws 84 into the threaded holes 64, 66 from an upper side of the solar modules 12, 60, the solar modules 12, 60 are tensioned with the base body 16. The base body 16 comprises stiffening elements 70. The stiffening elements 70 are embodied as crimps. The stiffening elements 70 are arranged in each case in proximities of the threaded holes 64, 66. The stiffening elements 70 are configured for stiffening the base body 16 at least in the proximities of the threaded holes 64, 66.

Figure 4A:
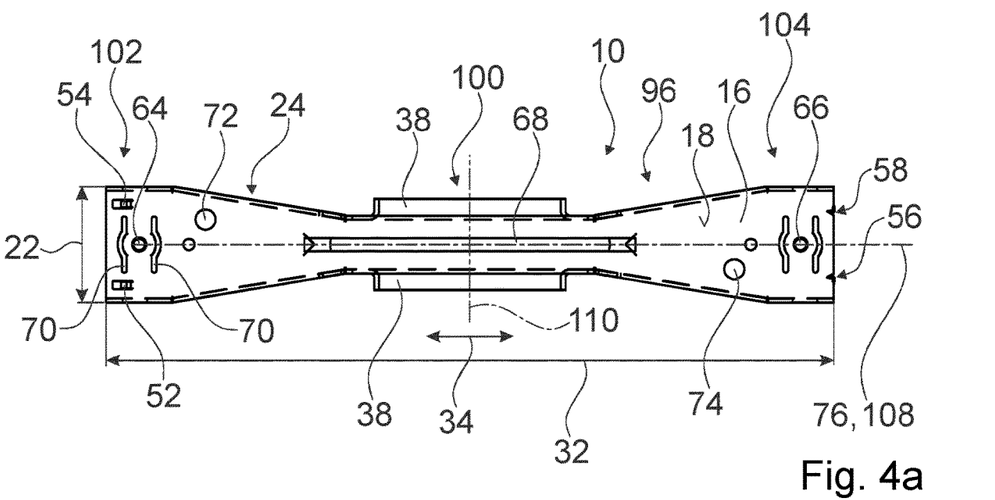
Figure 4B:
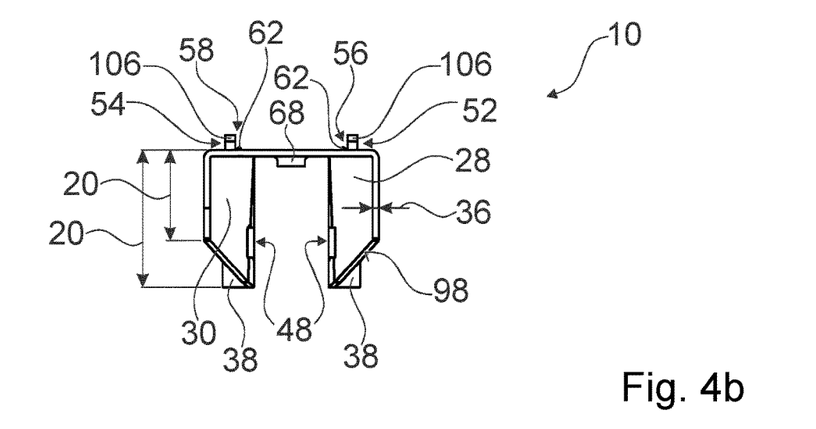

The base body 16 has a height 20 (see FIG. 4b). The height 20 of the base body 16 corresponds to an extension of the base body 16 perpendicularly to the support surface 18. The height 20 of the base body 16 varies along the longitudinal direction 34 of the base body 16. In the case shown in the figures, a maximum height is approximately 55 mm. The base body 16 has a width. The support surface 18 has a width 22 (see FIG. 4a). The width of the base body 16 corresponds to the width 22 of the support surface. The width 22 of the support surface 18 varies along the longitudinal direction 34 of the base body 16. In the case shown in the figures, a maximum width 22 of the support surface 18 is approximately 70 mm. The height 20 of the base body 16 and the width 22 of the support surface 18 are sectionwise anticorrelated along the longitudinal direction 34 of the base body 16.

The base body 16 comprises a tapering region 24. The base body 16 comprises a further tapering region 96. Within the tapering region 24, 96 the support surface 18 tapers toward a center 26 of the base body 16. Within the tapering region 24, 96 the width of the support surface 18 decreases toward the center 26 of the base body 16. In the example shown in the figures, the width 22 of the support surface 18 is reduced within the tapering region 24, 96 from 70 mm to 35 mm. Within the tapering region 24, 96, the height 20 of the base body 16 increases toward the center 26 of the base body 16. In the example shown in the figures, the height 20 of the base body 16 increases within the tapering region 24, 96 from 35 mm to 55 mm. Total lengths of developments of sections made perpendicularly to the longitudinal direction 34 of the base body 16 are at least substantially constant in the tapering region 24. The support surface 18 comprises a crimp 68. The crimp 68 is configured for a stiffening of the base body 16. The crimp 68 is arranged centrally in the base body 16. The crimp 68 is arranged centrally in the support surface 18. The crimp 68 extends between the tapering regions 24, 96. The crimp 68 extends parallel to the longitudinal direction 34. The crimp 68 is arranged in a central region 100 of the base body 16. The crimp 68 shown exemplarily in the figures has a length of 200 mm parallel to the longitudinal direction 34, a width of 8 mm perpendicularly to the longitudinal direction 34 and a depth of 2 mm perpendicularly to the support surface 18.

The solar module holding device 10 comprises a solar module holding element 52. The solar module holding element 52 is configured for a fixation and/or for a positioning of the solar module 12. The solar module holding device 10 comprises a further solar module holding element 54. The further solar module holding element 54 is configured for a fixation and/or for a positioning of a further solar module 60 which differs from the solar module 12. The solar module holding element 52 and/or the further solar module holding element 54 are/is integrally molded to the base body 16. The solar module holding element 52 and/or the further solar module holding element 54 are/is embodied in a one-part implementation with the base body 16. The solar module holding element/s 52, 54 is/are implemented in a hook shape. In an assembly of the solar park 78, the solar module holding elements 52, 54 serve for a hooking-in of respectively one of the solar modules 12, 60. The solar module holding element 52, 54 is bent at least substantially perpendicularly out of the support surface 18. The solar module holding element 52, 54 is arranged in the first end region 102 of the base body 16. The solar module holding elements 52, 54 in each case have a tip 106. The tips 106 of the solar module holding elements 52, 54 are bent off once more by about 90° relative to the regions of the solar module holding elements 52, 54 which are bent perpendicularly off the support surface 18. The tips 106 in each case point in a direction that extends parallel to the longitudinal direction 34. The tips 106 in each case point away from the center 26 of the base body 16. The solar module holding elements 52, 54 shown exemplarily in the figures protrude upwards beyond the support surface 18 by 6 mm. The tips 106 of the solar module holding elements 52, 54 shown exemplarily in the figures extend parallel to the support surface 18 over 3.5 mm. The solar module holding elements 52, 54 shown exemplarily in the figures have a width of 5 mm perpendicularly to the longitudinal direction 34. The solar module holding elements 52, 54 shown exemplarily in the figures are spaced apart from each other by 49 mm in a direction perpendicularly to the longitudinal direction 34. Respectively one of the solar module holding elements 52, 54 shown exemplarily in the figures is spaced apart, in a direction perpendicularly to the longitudinal direction 34, by approximately 8 mm from a respectively nearer-situated side wall 28, 30.

The solar module holding device 10 comprises a potential compensation element 56. The potential compensation element 56 is configured for electrically contacting the solar module 12 that is mounted via the solar module holding device 10, such that the solar module 12 and the base body 16 have identical base potentials. The potential compensation element 56 is configured for an electrical grounding of the solar module 12. The solar module holding device 10 comprises a further potential compensation element 58. The further potential compensation element 58 is configured for electrically contacting the further solar module 60 mounted via the solar module holding device 10, such that the further solar module 60, which differs from the solar module 12, and the base body 16 have identical base potentials. Thus the two solar modules 12, 60 also have identical base potentials. The further potential compensation element 58 is configured for an electrical grounding of the further solar module 60, which differs from the solar module 12. The potential compensation elements 56, 58 are integrally molded to the base body 16. The potential compensation elements 56, 58 are embodied in a one-part implementation with the base body 16. The potential compensation elements 56, 58 are arranged in the second end region 104 of the base body 16. The potential compensation elements 56, 58 in each case form a tip 62. The tips 62 of the potential compensation elements 56, 58 protrude beyond the support surface 18. The tips 62 of the potential compensation elements 56, 58, shown exemplarily in the figures, protrude by 1 mm beyond the support surface 18. The tips 62 of the potential compensation elements 56, 58, shown exemplarily in the figures, are spaced apart from each other by approximately 40 mm in the direction perpendicularly to the longitudinal direction 34. The potential compensation elements 56, 58 are configured to penetrate a surface layer of the respective solar module 12, 60 lying upon the support surface 18 in a region of the respective potential compensation element 56, 58. The surface layer of the solar modules 12, 60 that is to be penetrated by the potential compensation elements 56, 58 may be embodied, for example, as an anodized layer.

The base body 16 has at least two recesses 72, 74 for receiving blind rivets. The recesses 72, 74 for receiving blind rivets are arranged on the support surface 18. Respectively one recess 72, 74 for receiving a blind rivet is arranged in respectively one of the tapering regions 24, 96. The recesses 72, 74 for receiving blind rivets are arranged offset sidewise relative to the central axis 76 of the base body 16 that runs parallel to the longitudinal direction 34 of the base body 16 (see also FIG. 4a). In the base body 16 shown exemplarily in the figures, the recesses 72, 74 for receiving blind rivets are offset sidewise from the central axis 76 by 15 mm. The recesses 72, 74 for receiving blind rivets shown in the figures are spaced apart from each other in the longitudinal direction 34 by 320 mm.

The base body 16 has a side wall 28. The base body 16 has a further side wall 30. The side walls 28, 30 of the base body 16 are bent off perpendicularly to the support surface 18. The side walls 28, 30 are arranged on opposite sides of the base body 16. The side walls 28, 30 are arranged on the sides of the base body 16 which are situated perpendicularly to the longitudinal direction 34 of the base body 16. The side walls 28, 30 delimit the base body 16 sidewise along a large portion of a longitudinal extension 32 of the base body 16 (see also FIG. 4a). The base body 16 comprises edge areas 98 in peripheral regions. In the regions in which the side walls 28, 30 delimit the base body 16 sidewise, the edge areas 98 of the base body 16 are not aligned perpendicularly to the support surface 18 (see also FIG. 4b). A large portion of the base body 16 has a constant material thickness 36 (see also FIG. 4b). The material thicknesses 36 of the side walls 28, 30 are substantially identical to the material thickness 36 of the support surface 18. The material thicknesses 36 in the tapering region 24, 96 are substantially identical to the material thickness 36 in the central region 100 of the base body 16 or to the material thicknesses 36 in the end regions 102, 104 of the base body 16. A maximum longitudinal extension 32 of the solar module holding device 10, in particular of the base body 16, is preferably at least 350 mm, preferably at least 420 mm and preferentially at least 430 mm. Particularly preferentially, in particular in an alternative implementation of the solar module holding device 10, the maximum longitudinal extension 32 of the solar module holding device 10, in particular of the base body 16, is greater than 500 mm, preferably greater than 650 mm and particularly preferentially greater than 800 mm.

The base body 16 forms a shaft support element 38. The shaft support element 38 is configured for a support of the base body 16 on a surface 92 of the shaft 14. The shaft support element 38 forms a shaft support surface 40, which is configured to lie upon the surface 92 of the shaft 14 in the mounted state (see also FIG. 3). The base body 16 forms respectively one shaft support element 38 on two opposite sides. The side walls 28, 30 in each case form a shaft support element 38. Respectively one shaft support element 38 is molded on respectively one side wall 28, 30. The shaft support elements 38 are embodied in a one-part implementation with the base body 16. The shaft support elements 38 are bent off substantially perpendicularly to the side walls 28, 30. The shaft support elements 38 protrude substantially perpendicularly beyond the side walls 28, 30. The shaft support element 38, in particular each of the shaft support elements 38, has an extension perpendicularly to the longitudinal direction 34 of the support surface 18 of the base body 16, which is equivalent to four times the material thickness 36 of the base body 16. In the example shown in the figures, the extension of the shaft support element 38 perpendicularly to the longitudinal direction 34 of the support surface 18 of the base body 16 is 10 mm. The extension of the shaft support element 38 perpendicularly to the longitudinal direction 34 of the support surface 18 is constant. Alternatively, the extension of the shaft support element 38 perpendicularly to the longitudinal direction 34 of the support surface 18 could be variable, for example having a larger or smaller dimension in a contact region of the shaft support element 38 with the shaft 14. The shaft support surface 40 formed by the shaft support element 38 forms, in a side view onto the base body 16 (see also FIG. 3), a polygonal, in particular a hexagonal, contour. The crimp 68 is arranged in a region of the support surface 18 that is situated between the two shaft support elements 38.

Figure 3:
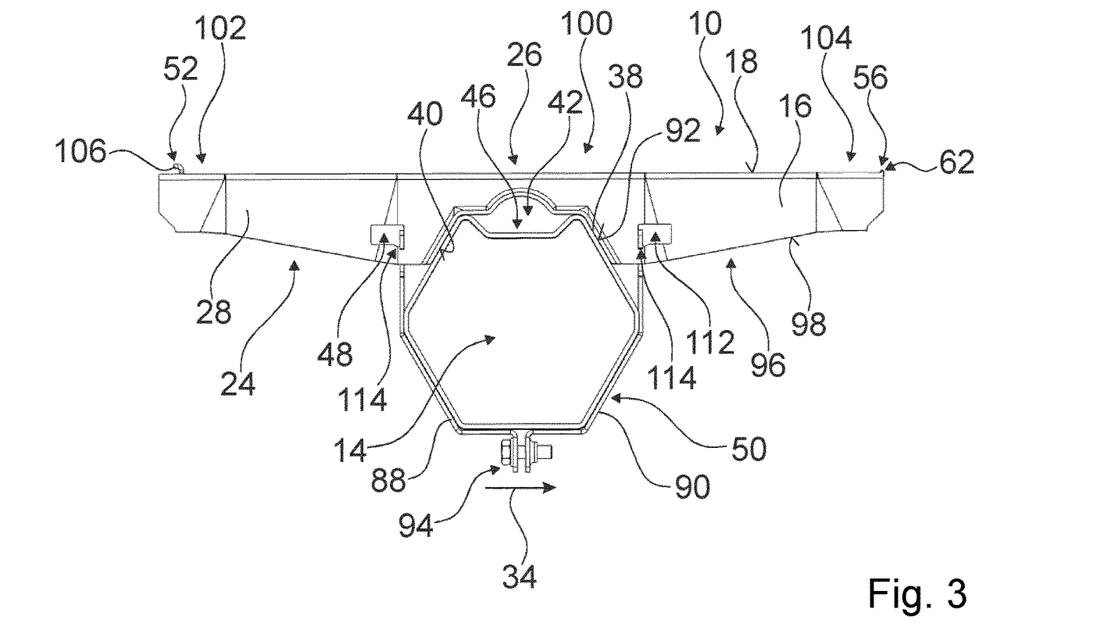

The solar module holding device 10 comprises a shaft mounting clamp 50. The shaft mounting clamp 50 is configured to enable a rotationally fixed mounting of the base body 16 on the shaft 14. FIG. 3 shows a side view of the base body 16 and of the shaft mounting clamp 50. The shaft mounting clamp 50 comprises two clamping elements 88, 90. The clamping elements 88, 90 are implemented separately from each other. The clamping elements 88, 90 are implemented at least substantially identically to each other. In the mounted state shown in FIG. 3, the clamping elements 88, 90 are arranged mirror-symmetrically to each other. The shaft mounting clamp 50 is configured to at least partially engage around the shaft 14. The shaft mounting clamp 50 is configured to engage around a side of the shaft 14 that faces away from the base body 16 in the mounted state. The shaft mounting clamp 50 is configured to press the base body 16 to a portion of the surface 92 of the shaft 14. The clamping elements 88, 90 are connectable via a screw connection 94. The screw connection 94 is configured for tensioning the base body 16 and the shaft 14 with each other.

The side walls 28, 30 have respectively two recesses 48, 112, which are configured for a fixation of the shaft mounting clamp 50. The recesses 48, 112 are embodied as rectangular long holes which in each case form, on ends facing toward the center 26 of the base body 16, a ledge 114, which enlarges a width of the respective recess 48, 112 in a direction perpendicular to the support surface 18. The clamping elements 88, 90 of the shaft mounting clamp 50 are configured to perpendicularly engage into the recesses 48, 112 of the side walls 28, 30. The ledge 114 is configured to secure the clamping elements 88, 90, after pressing the shaft 14 to the base body 16, in a mounting position by tightening the screw connection 94. The clamping elements 88, 90 shown exemplarily in FIG. 2 have a hook shape in the regions engaging into the recesses 48, 112 of the side walls 28, 30, thus enabling further improvement of a securing of the mounting position. The recess 48 for receiving the shaft mounting clamp 50 is arranged partially in the tapering region 24, 96 of the base body 16. The recess 48 for receiving the shaft mounting clamp 50 is to a large portion arranged in the tapering region 24, 96 of the base body 16. The recess 48 for receiving the shaft mounting clamp 50 is arranged in the tapering region 24, 96 of the base body 16 with the exception of that portion of the recess 48 for receiving the shaft mounting clamp 50 which has the ledge 114. The portion of the recess 48 for receiving the shaft mounting clamp 50 which has the ledge 114 is arranged in a middle portion of the base body 16, in particular the central region 100 of the base body 16, situated between the two tapering regions 24, 96.

FIG. 3 moreover shows that the shaft support element 38 comprises a partial region 42 which is configured to remain free of a contact to the shaft 14 when the base body 16 lies upon the shaft 14, and which thus provides in the longitudinal direction 44 of the shaft an, in particular enlarged, interspace 46 between the shaft 14 and the base body 16. In the partial region 42 of the shaft support element 38, the shaft support element 38 is implemented in a curved fashion. In the partial region 42 of the shaft support element 38, the shaft support element 38 is implemented to be curved with a bulge toward the support surface 18.

FIGS. 4a and 4b show different views of the base body 16. With the exception of the recesses 72, 74 for receiving blind rivets, the base body 16 is implemented mirror-symmetrically to the mirror planes 108, 110 indicated in FIG. 4a.

Figure 5:
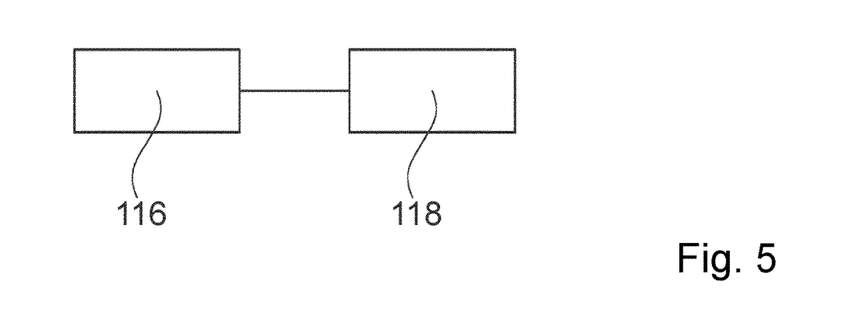

FIG. 5 shows a flow chart of a method for producing the base body 16 of the solar module holding device 10. In at least one method step 116, an at least substantially rectangular and flat original sheet is provided. In at least one further method step 118, the original sheet is punched and bent. In the method step 118 the material thickness 36 of the metal sheet is maintained at least in a large portion of the metal sheet. In the method step 118 the base body 16 is produced in its final form. In the method step 118 sheet offcut of less than 10% of the original sheet is produced during the production of the base body 16. In the method step 118 the base body 16 is manufactured via a pressing method. In the method step 118, in a pressing process of the pressing method, maximally 5% of a total area of the original sheet which the base body 16 is produced from is exposed to an essential tensile stress. In the method step 118, in the pressing step of the pressing method, a material thickness 36 of the metal sheet which the base body 16 is produced from is changed on maximally 5% of a total area of the metal sheet.

REFERENCE NUMERALS 10 solar module holding device
12 solar module
14 shaft
16 base body
18 support surface
20 height
22 width
24 tapering region
26 center
28 side wall
30 side wall
32 longitudinal extension
34 longitudinal direction
36 material thickness
38 shaft support element
40 shaft support surface
42 partial region
44 longitudinal direction
46 interspace
48 recess
50 shaft mounting clamp
52 solar module holding element
54 further solar module holding element
56 potential compensation element
58 further potential compensation element
60 further solar module
62 tip
64 threaded hole
66 threaded hole
68 crimp
70 stiffening element
72 recess
74 recess
76 central axis
78 solar park
80 drive unit
82 fixation platelet
84 fixation screws
86 edge
88 clamping element
90 clamping element
92 surface
94 screw connection
96 tapering region
98 edge area
100 central region
102 end region
104 end region
106 tip
108 mirror plane
110 mirror plane
112 recess
114 ledge
116 method step
118 method step

The invention claimed is:

1. A solar module holding device comprising:
a base body that forms at least one support surface;
wherein the base body is configured to assemble at least one solar-position-tracking solar module, to a rotatable shaft;
the base body that forms at least one support surface is configured to support at least of a portion of the at least one solar-position-tracking solar module, the base body being a single sheet part, with at least one first solar module holding element that is molded on and integrated with the base body and is configured for fixation of a first solar module, with at least one second solar module holding element that is molded on and integrated with the base body and is configured for fixation of a second solar module that is different from the first solar module, each of the first and second solar module holding elements being implemented in a hook shape and protruding from the support surface of the base body, wherein each of the first and second solar module holding elements are configured to establish a form-fit connection with the first and second solar modules respectively, wherein the base body comprises a first side wall and a second side wall, and wherein the first solar module holding element and the second solar module holding element are molded on the base body integrally, in each case offset from a central line of a support surface outward, toward the respective side walls.

2. The solar module holding device according to claim 1, wherein a height of the base body and a width of the support surface of the base body are at least section-wise anticorrelated.

3. The solar module holding device according to claim 1, wherein the base body comprises at least one tapering region, within which the support surface tapers toward a center of the base body.

4. The solar module holding device according to claim 3, wherein a height of the base body increases in the tapering region toward the center of the base body.

5. The solar module holding device according to claim 1, wherein at least one of the first or second side walls is bent off substantially perpendicular to the support surface.

6. The solar module holding device according to claim 5, wherein the side wall delimits the base body sidewise along at least 51% of a longitudinal extension of the base body.

7. The solar module holding device according to claim 5, wherein the side wall has at least one recess that is configured for a fixation of a shaft mounting clamp.

8. The solar module holding device according claim 7, wherein the recess for receiving the shaft mounting clamp is arranged at least partly in a tapering region of the base body.

9. The solar module holding device according to claim 1, wherein total lengths of developments of sections made perpendicular to a longitudinal direction of the base body are substantially constant over a large portion of the base body, in the tapering region.

10. The solar module holding device according to claim 1, wherein at least at least 51% of the base body has a substantially constant material thickness.

11. The solar module holding device according to claim 1, wherein the side wall, forms at least one shaft support element, which is configured to support the base body on the rotatable shaft.

12. The solar module holding device according to claim 11, wherein the shaft support element has an extension perpendicular to a longitudinal direction of the support surface of the base body, which is equivalent at least to a three-fold of a material thickness of the base body.

13. The solar module holding device according to claim 11, wherein a shaft support surface formed by the shaft support element forms, in a side view onto the base body, a substantially polygonal contour.

14. The solar module holding device according to claim 11, wherein the shaft support element comprises at least one partial region which is configured, when the base body lies upon the shaft, to remain free of a contact with the shaft, thus providing an interspace between the shaft and the base body in a longitudinal direction of the shaft.

15. The solar module holding device according claim 1, comprising at least one potential compensation element, which is molded on the base body integrally and which is configured for an electrical grounding of a solar module.

16. The solar module holding device according to claim 15, comprising at least one further potential compensation element, which is molded on the base body integrally and which is configured for an electrical grounding of a further solar module that is different from the solar module.

17. The solar module holding device according to claim 15, wherein the potential compensation element/s forms/form at least one tip, which protrudes from the support surface and which is configured to penetrate a surface layer of the solar module lying upon the support surface, for example an anodized layer of the solar module.

18. The solar module holding device according to claim 1, wherein the base body comprises on the support surface at least one threaded hole.

19. The solar module holding device according to claim 18, wherein the base body comprises a stiffening element, which is arranged in a proximity of the threaded hole and is configured for stiffening the base body at least in the proximity of the threaded hole.

20. The solar module holding device according to claim 1, wherein the support surface comprises at least one crimp for a stiffening of the base body, which is arranged at or near a center of the base body.

21. The solar module holding device according to claim 1, wherein the base body comprises at least one recess for receiving a blind rivet, which is arranged offset sidewise relative to a central axis of the base body that runs parallel to a longitudinal direction of the base body.

22. The solar module holding device according to claim 1, wherein the base body is implemented in a mirror-symmetrical manner, with the exception of recesses for receiving blind rivets.

23. The solar module holding device according to claim 1, wherein the base body comprises an anticorrosion protection coating.

24. The solar module holding device according to claim 1, further comprising a shaft mounting clamp, which is configured for a rotationally fixed mounting of the base body to the shaft.

25. A solar park with a plurality of solar module holding devices according to claim 24, with at least one shaft and with a plurality of solar modules.

* * * * *